F. R. C. BOYD.
THRUST BEARING.
APPLICATION FILED MAR. 25, 1909.
980,482.
Patented Jan. 3, 1911.
2 SHEETS—SHEET 1.
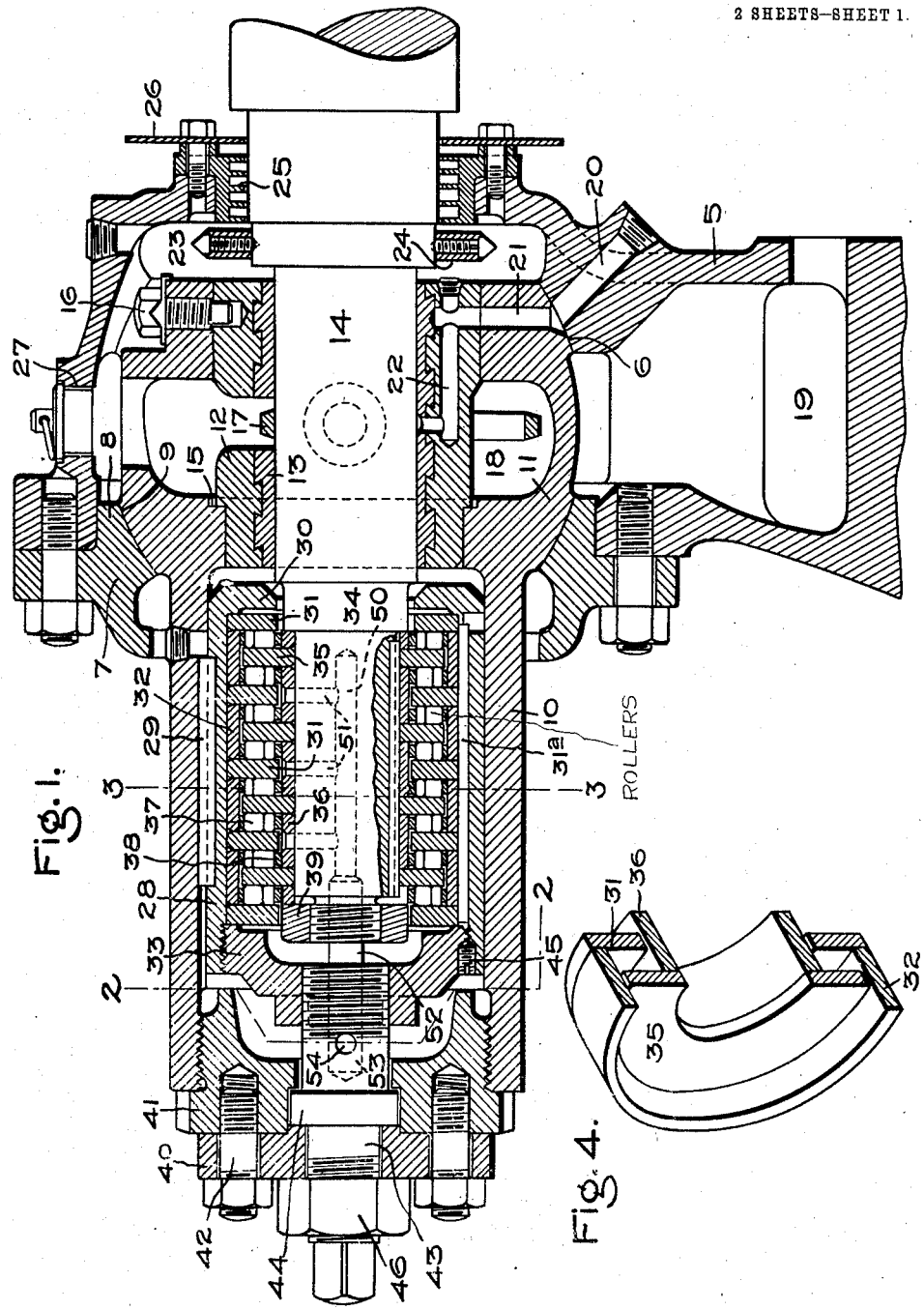
Witnesses:
Marcus L. Byng
J. Ellis Glen
Inventor,
Frederic R. C. Boyd,
by
Att'y.

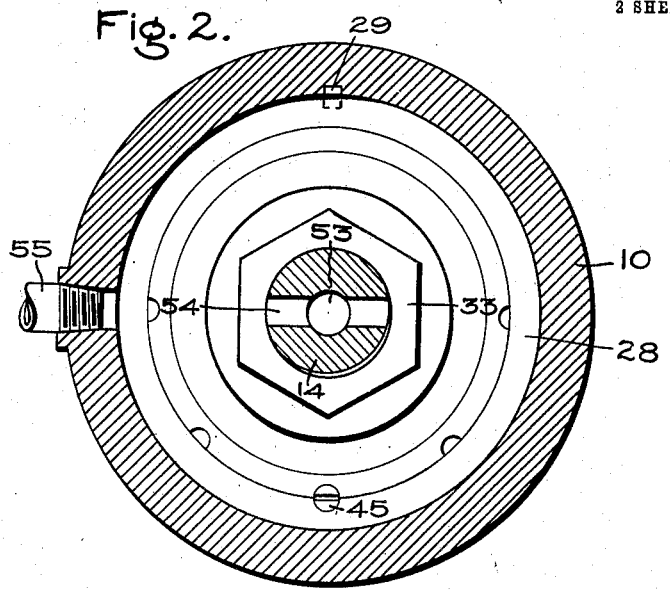
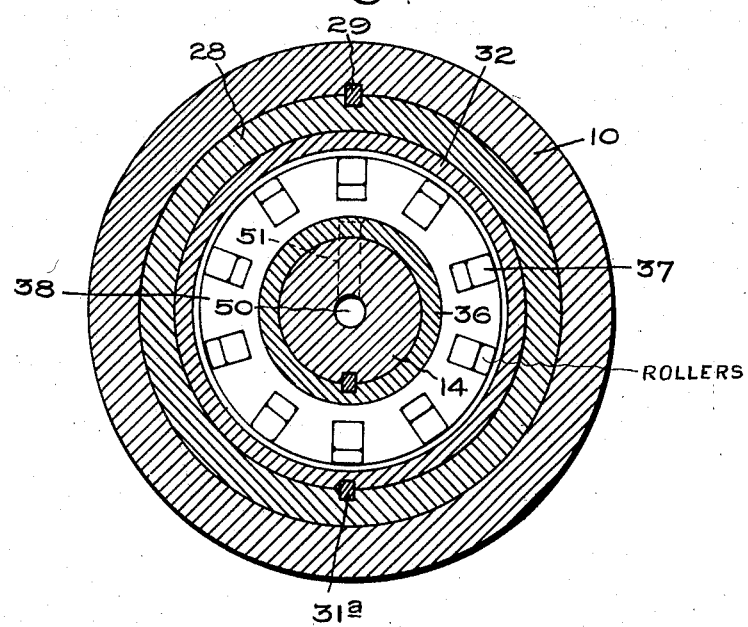

UNITED STATES PATENT OFFICE.

FREDERIC R. C. BOYD, OF LYNN, MASSACHUSETTS, ASSIGNOR TO GENERAL ELECTRIC COMPANY, A CORPORATION OF NEW YORK.

THRUST-BEARING.

980,482.  Specification of Letters Patent.  Patented Jan. 3, 1911.

Application filed March 25, 1909. Serial No. 485,783.

*To all whom it may concern:*

Be it known that I, FREDERIC R. C. BOYD, a citizen of the United States, residing at Lynn, county of Essex, State of Massachusetts, have invented certain new and useful Improvements in Thrust-Bearings, of which the following is a specification.

The present invention relates to thrust bearings and more especially to those intended for turbine driven apparatus and has for its object to improve their construction.

For a consideration of what I believe to be novel and my invention, attention is directed to the accompanying specification and claims appended thereto.

In the accompanying drawings which illustrate one of the embodiments of my invention, Figure 1 is an axial section of shaft and thrust bearings; Fig. 2 is a cross-sectional view of the same taken on line 2—2 of Fig. 1; Fig. 3 is a cross-sectional view taken on line 3—3 of Fig. 1; and Fig. 4 is a perspective view showing the thrust collars and spacers.

5 indicates the pillow block that is suitably supported from a bed-plate or other means. This pillow block is provided with a spherical surfaced seat 6. It is also provided with a removable head 7 that has a shoulder 8 which fits into an annular opening in the side of the pillow block and centers the head. The internal face of the head is provided with a spherical surface 9 that is struck from the same center as the surface 6. The head 7 is secured in place by a number of stud bolts and may be made in one piece or split as desired. The pillow block may be provided with a removable cap or it may be made solid as desired.

Located within the pillow block is a tubular member 10 having an enlargement 11 which is provided with a spherical surface, this surface being struck from the same center as the spherical surfaced seat. The diameter of the enlargement of the member 10 is somewhat less than the opening in the pillow block that receives the shoulder 8 on the head. By reason of this construction it is possible to remove the tubular member and the parts of the thrust bearing from one end of the shaft without affecting the apparatus driven by the shaft other than to block up the shaft sufficiently to support the weight of the parts.

Located within the enlarged head of the tubular member is a concentric sleeve 12 that is provided with a babbitt lining 13, the latter forming the bearing surface for supporting the shaft 14. The sleeve 12 is slipped into place in the tubular member from the right-hand side and is held against axial movement by the shoulder 15 and the bolt 16, the latter being carried by the tubular member and provided with an extension that enters a hole in the sleeve. The sleeve and lining are cut away at a central point to receive the oil ring 17, the latter extending into the well 18. The pillow block is provided with a chamber 19 that may or may not be filled with oil as desired. Oil may be supplied to the bearing under pressure by the passage 20 formed in the pillow block and the passages 21 and 22 formed in the tubular member and the bearing sleeve. To prevent the lubricant from working out of the bearing an annular chamber 23 is provided within which is located an oil thrower 24, the latter being carried by a shoulder on the shaft. The chamber 23 is or may be connected by one or more passages with the chamber 19 in the base of the pillow block, as indicated by the dotted line. As an additional precaution against the escape of lubricant, a baffler 25 is provided that consists of an annular member having a series of internal grooves. The baffler is provided with an outwardly-extending flange and the latter is bolted to the side face of the pillow block. As a further precaution a shield-plate 26 may be employed. Lubricant may be introduced into the bearing through the opening 27, and the passage 20 used as a drain.

The left hand portion of the tubular member is bored to receive the concentric sleeve 28. This sleeve is prevented from rotating by the spline 29 but may be adjusted longitudinally. The right hand end of the sleeve is provided with an internal flange or shoulder 30 that acts as a fixed abutment or stop for the stationary thrust collars 31 held against rotation by the spline 31ª, of which collars as many may be provided as it is desired. Between the stationary thrust collars are stationary spacers 32 made in the form of rings. The left hand end of the sleeve is threaded internally to receive the nut 33, the latter serving to clamp the stationary thrust collars and the spacers securely in place against the shoulder 30.

The shaft 14 is provided with a shoulder 34 against which the thrust collars and spacers are clamped. Splined on the shaft and rotating with it are thrust collars 35. These collars are separated one from the other by spacers 36. These spacers are identical in shape and size except those at the extreme ends which may have a thickness equal to the diameter of the rollers or balls 37 that transmit the thrust from the rotary to the stationary thrust collars. The rollers are held in suitable containers 38.

The rotating thrust collars and spacers are held in place by a nut 39 that is mounted on the end of the shaft. By screwing the nut into place the parts are clamped between it and the shoulder 34.

In the particular illustration of my invention I have shown a multiple arrangement of cells or chambers formed of hardened steel parts or thrust collars, between which are located the hardened steel rollers. In the particular embodiment of my invention I have shown four such cells or units, each unit having two sets of rollers, one set to absorb the thrust in one direction and the other to absorb the thrust in the opposite direction.

All of the stationary thrust collars are of the same thickness so that they can be ground at one setting on a grinding machine, thereby insuring exact uniformity. Similarly, the fixed and revolving spaces are all of the same thickness so that they can be ground at one setting. This construction insures absolute uniformity as to dimensions of as many cells or units as it may be desirable to use. The thrust load is divided equally between the several cells or units, except in so far as prevented by inaccuracies of the rollers located between the collars. Suitable care in the manufacture of these rollers will reduce this chance for error to a minimum, but even if this error is not entirely eliminated, it is evident that in starting up the apparatus whichever rollers are over size will absorb the complete thrust until they are worn sufficiently to permit the remaining rollers or balls to carry their proportionate share.

In a structure of this character it is highly desirable to be able to adjust the longitudinal position of the shaft in order to fix the clearances between the moving parts either on the turbine or on the apparatus driven thereby. To this end a head is provided for the tubular member which head comprises parts 40 and 41. The part 41 is screw-threaded into the tubular member and the former is secured to the latter by stud bolts 42. The parts are bored centrally to receive the adjusting screw 43, the latter being provided with a collar 44 which is located in a recess formed between the parts of the head so that it is prevented from moving axially except possibly by a very limited amount to insure freedom of operation. The clamping nut 33 is bored centrally to receive the adjusting screw and the nut is prevented from turning independently of the collar supporting sleeve 28 by means of one or more screws 45. For the purpose of adjustment, the nut may be provided with a number of screw-receiving openings so that the nut can be moved a slight amount in either direction and afterward be clamped in place by the screw 45. The end of the adjusting screw 43 is squared to receive a wrench. It is also provided with a nut 46 by means of which the collar 44 is firmly held against the part 40 of the head. By slacking off the nut 46 and applying a wrench to the end of the adjusting screw, the shaft 14 and the thrust bearing can be moved axially to the desired position after which the nut 46 is seated.

In a construction of this character it is highly desirable to keep the parts well lubricated. To this end I bore a hole 50 in the shaft and drill into it radial holes 51 which register with holes in the spacers 36. A pipe 52 is tapped into the end of the shaft which pipe extends a short distance into a hole 53 drilled in the adjusting screw. The adjusting screw is provided with one or more radial holes 54, Figs. 1 and 2, which serve to convey oil from the chamber surrounding the adjusting screw to the pipe 52 and the passages 50 and 51 in the shaft. As the shaft rotates, the centrifugal force sucks oil into the shaft and throws it outwardly through the radial passages 51. Lubricant may be admitted to the chamber around the adjusting screw by the pipe 55, Fig. 2.

It is to be noted that the tubular member which carries the stationary part of the thrust bearing has the same center of movement as does the shaft bearing. This means that no matter how much the shaft may be deflected, due to inaccuracies in alinement, springing of the shaft, or sudden changes in load, that the thrust collars will also be moved and that they will at all times be held with their working faces perpendicular to the axis of the shaft. It is evident that whatever force causes the shaft to be deflected it will correspondingly change the position of its bearing and with it the position of the parts of the thrust bearing.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. In combination, a support having a spherical surfaced seat, a self-alining member carried thereby and comprising an enlargement movable on the seat and a tubular extension that projects outside of the support, a shaft, a parallel bearing for the shaft located in said enlargement, and thrust collars carried by the tubular extension and also by the shaft which are at all times maintained perpendicular to the shaft axis.

2. In combination, a pillow block having a spherical surfaced seat, a self-alining member carried thereby and comprising an enlargement movable on the seat and a tubular extension that projects outside of and beyond the support, a parallel bearing for the shaft carried by the enlargement and adjustable with it, said bearing extending substantially the entire axial length of the enlargement, thrust means carried by the shaft, other thrust means carried by the tubular extension and coöperating with those on the shaft, and means for adjusting the shaft and the thrust means longitudinally.

3. In combination, a pillow block having a spherical surfaced seat, a self alining member carried thereby and movable on the seat, a bearing for the shaft carried by said member and adjustable with it, a plurality of thrust collars mounted on the shaft, a plurality of thrust collars carried by said member, clamping means for said collars, rolling means located between said collars for transmitting thrust, and an adjusting screw for moving the shaft and the thrust collars longitudinally.

4. In combination, a support having a spherical surfaced seat, a self alining member carried thereby and comprising an enlargement movable on the seat and a tubular portion extending outside of the support, a shaft, means for longitudinally adjusting the shaft within the tubular portion of the member, thrust collars supported by said tubular portion, and other thrust collars supported by and turning with the shaft, which transmit the thrust thereof to said member.

5. In combination, a support having a spherical surfaced seat, a self alining member carried thereby and movable on the seat, a shaft, thrust collars supported by the member, other thrust collars supported by and turning with the shaft, spacers located between the stationary and also between the rotary thrust collars, and rolling means located between the collars for transmitting the thrust of the shaft to said member.

6. In combination, a support having a spherical surfaced seat, a self alining member carried thereby and movable on the seat, a shaft, a sleeve located within said member and arranged to make a sliding fit therein, thrust collars mounted in the sleeve, other thrust collars mounted on the shaft, a means for clamping the collars carried by the sleeve against axial movement, other means for clamping the collars carried by the shaft against axial movement, and rolling means located between the collars for transmitting thrust from the shaft to said member.

7. In combination, a support having a spherical surfaced seat, a self alining member carried thereby and movable on the seat, a shaft, a sleeve located within said member and supported thereby, thrust collars mounted in the sleeve, other thrust collars mounted on the shaft, a means for clamping the collars carried by the sleeve, other means for clamping the collars carried by the shaft, and a means carried by the tubular member for adjusting the position of the sleeve.

8. In combination, a support having a spherical surfaced seat, a self alining member carried thereby and movable on the seat, a sleeve located within said member and supported thereby, thrust collars mounted in the sleeve, other thrust collars mounted on the shaft, a nut screw-threaded to the sleeve for clamping the stationary thrust collars, a nut and shoulder on the shaft for clamping the rotary thrust collars, rolling means located between the stationary and rotary collars for transmitting the thrust of the shaft to said member, and an adjusting screw for adjusting the position of the sleeve in said member.

9. In combination, a support having a spherical surfaced seat, a self-alining tubular member carried thereby and movable on the seat, a shaft, a sleeve splined in the member, stationary thrust collars carried by the sleeve, other collars carried by the shaft, spacers between both sets of collars, a clamp for securing the stationary collars and spacers, a clamp for securing the rotary collars and spacers on the shaft, rolling means located between the collars, and an adjusting screw that is anchored in the tubular member and engages a part of the clamp for moving the sleeve bodily to and fro.

10. In combination, a support having a spherical surfaced seat, a self-alining tubular member carried thereby and movable on the seat, a shaft, a sleeve splined in the member, stationary thrust collars carried by the sleeve, other collars carried by the shaft, spacers between both sets of collars, a clamp for securing the stationary collars and spacers, a clamp for securing the rotary collars and spacers on the shaft, rolling means located between the collars, a divided head for one end of the tubular member, and an adjusting screw that has a collar located between and confined by the parts of the head, one end of said screw being threaded into the clamp.

11. In combination, a support having a spherical surfaced seat, a detachable head therefor that is attached to the side of the support and forms a part of the seat and has a centering shoulder that is larger in diameter than the spherical surfaced portion of the tubular member, a tubular member having a spherical surfaced portion that engages the seat and is held solely by it against axial movement and thrust collars carried by the shaft and said member respectively.

12. In combination, a support having a spherical surfaced seat, a shaft, a self alining member carried thereby which may be removed from the shaft by an endwise movement, a means for securing the member in the support, a series of thrust absorbing collars which may also be removed from one end of the shaft, means located at the end of the shaft for securing its thrust collars in place, and a means at the outer end of said member for securing its thrust collars in place.

13. In combination, a shaft, a support having a spherical surfaced seat, a self alining member having an enlargement that engages the seat, a parallel bearing for the shaft carried by the member, a tubular extension on said member, fixed collars carried by the shaft, fixed collars carried by the tubular extension at one side of said bearing, and rolling means located between the collars to transmit end thrust of the shaft in either direction to the collars carried by said member.

14. In combination, a support having a seat, a member supported thereby and held against axial movement, said member including a tubular extension, a sleeve that is splined in the extension and is provided at one end with an internal shoulder and at the other end with a screw thread, collars mounted on the shaft and clamped against endwise movement thereon, collars mounted in the sleeve, one of which engages the shoulder, a head threaded to the sleeve for holding the collars carried thereby, and rollers between the collars.

In witness whereof, I have hereunto set my hand this 23rd day of March, 1909.

FREDERIC R. C. BOYD.

Witnesses:
 DUGALD McK. McKILLOP,
 CHARLES A. BARNARD.